Figure 1:
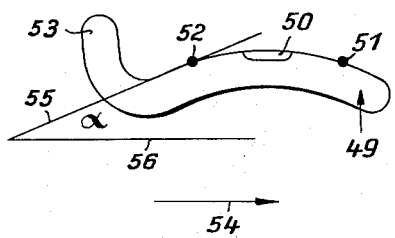

Aug. 22, 1961  W. RÖTTCHER  2,996,919
APPARATUS WORKING ON THE INERTIA PRINCIPLE FOR MEASURING AND
RECORDING ACCELERATION AND RETARDATION, ESPECIALLY
OF POWERED VEHICLES

Filed Sept. 10, 1958  2 Sheets-Sheet 1

INVENTOR
Wilhelm Röttcher
BY
Beaman & Beaman

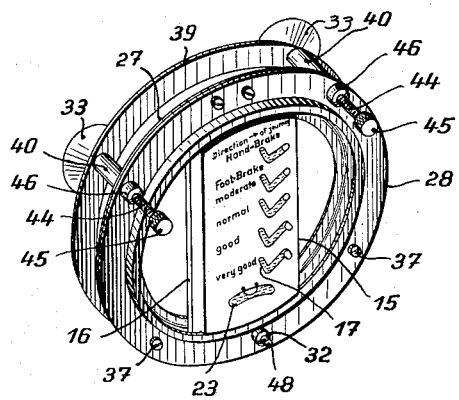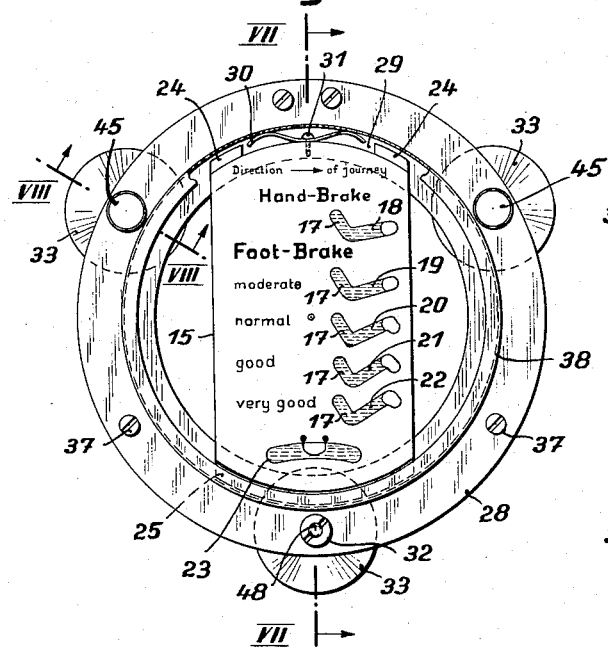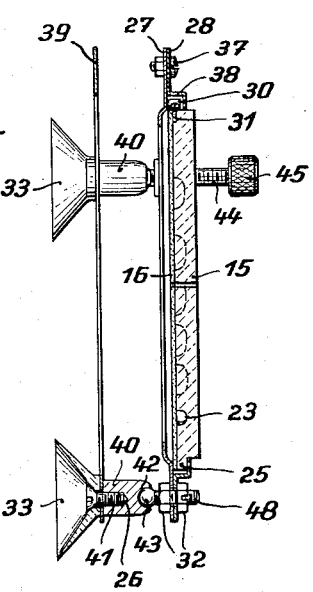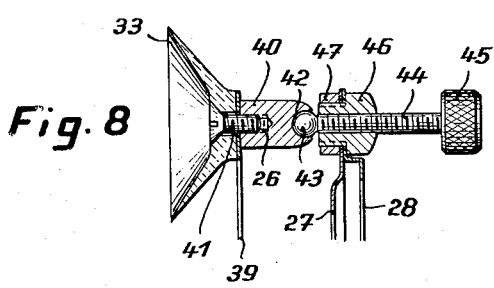

United States Patent Office 2,996,919
Patented Aug. 22, 1961

2,996,919
APPARATUS WORKING ON THE INERTIA PRINCIPLE FOR MEASURING AND RECORDING ACCELERATION AND RETARDATION, ESPECIALLY OF POWERED VEHICLES
Wilhelm Röttcher, Dankersstrasse 13, Stade, Germany
Filed Sept. 10, 1958, Ser. No. 760,120
5 Claims. (Cl. 73—492)

The invention relates to apparatus working on the inertia principle for measuring and recording the acceleration and retardation, especially of powered vehicles.

The problem with which the invention deals consists in the provisions of a recording apparatus of this type with greater sensitivity, sufficient damping and precise readibility. A further problem dealt with by the invention consists in the provision of apparatus of this kind which is simple and well arranged both in construction and servicing.

The invention is characterized by the combination of the following characteristics:

(a) A liquid-filled level tube provided with an air bubble is arranged to extend in the direction of the acceleration or retardation component to be measured and is concave in the vertical plane towards the centre point of the earth.

(b) The level tube is provided for the purpose of obtaining a limit measurement at its one end with a discontinuous upwardly directed tube portion, i.e. catch chamber or collection chamber.

In this way is provided an apparatus which is extraordinarily sensitive and at the same time possesses sufficient damping. In a level tube of this kind, the liquid of the reactive mass is self damping. The air bubble only makes the position known at which no liquid is to be found. In these circumstances, a liquid of only slight inertia can be used without prejudicing the damping, for example, petroleum or ether.

The end of the level tube measuring the retardation or acceleration can have a continuous curvature, to which is connected the discontinuously upwardly curved end of the catch chamber. It is however also possible to make the radius of the curved end portion running concave to the earth's middle point of the acceleration or retardation measuring tube infinitely great, so that this level-tube end extends in a straight line. This level-tube then indicates each retardation or acceleration which corresponds to the inclination of the straight end to the horizontal, in that the air bubble goes over the straight measuring end of the level-tube into the catch chamber as soon as the acceleration or retardation value which corresponds to the inclination of the measuring tube is reached and exceeded.

In all cases an apparatus is given which on the one hand affords great sensitivity to retardation or acceleration impulses and on the other hand is sufficiently damped, so that it cannot be addressed to every inaccuracy of the path travelled. The damping is afforded only by the nature of the liquid, so that the manufacture of the tube for receiving the liquid calls for no special care. The apparatus is extraordinarily simple in servicing and handling in that it is easily adjustable to each vehicle or can be built into position. Reading is extremely simple in that the apparatus shows limit values which can be read by each layman after carrying out a retardation or acceleration trial.

With reference to the accompanying drawings, further improvements and advantageous constructions of the invention are illustrated.

Figure 2:
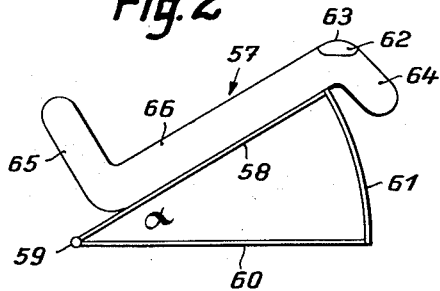
Figure 3:
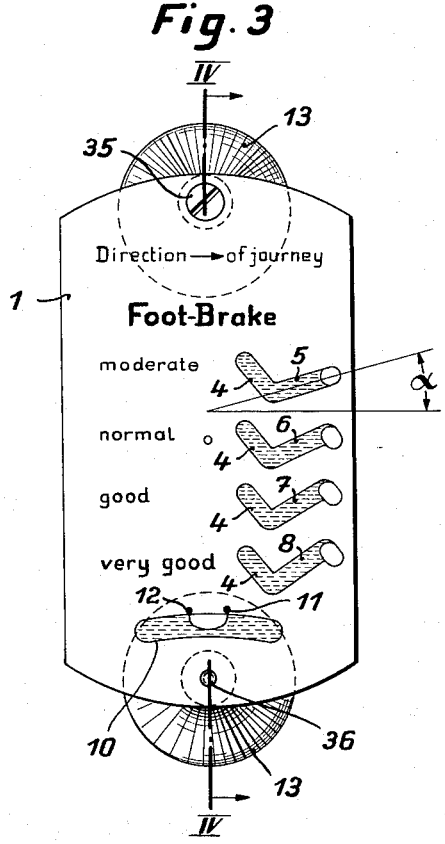
Figure 4:
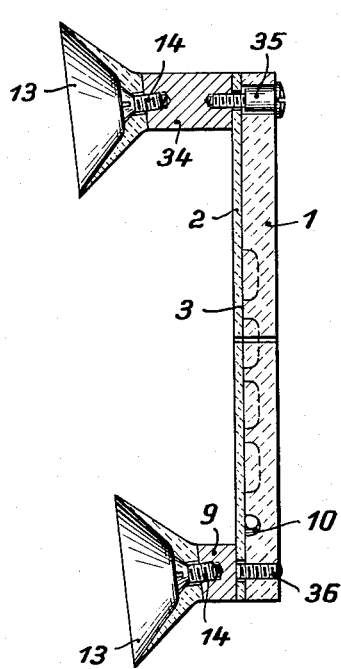

They show:
FIGURE 1, a level tube built according to the invention for measurement of acceleration or de-acceleration in schematic representation for explanation of the basic principle;

FIGURE 2, an especially simple constructional form of the invention in schematic representation;

FIGURE 3, a view from the front of a constructionally simple embodiment of the invention;

FIGURE 4, a section on the line IV—IV of FIGURE 3;

FIGURE 5, a perspective representation of a structurally somewhat expensive construction of the invention;

FIGURE 6, a view from the front of the apparatus of FIGURE 5;

FIGURE 7, a section on the line VI—VI of FIGURE 6; and

FIGURE 8, a partial section on the line VIII—VIII of FIGURE 6.

In describing the invention reference is first made to FIGURE 1. This shows in schematic form a tube 49 of glass or plastic material which is filled for example with coloured alcohol, ether or petroleum and includes an air bubble 50. The tube 49 has a uniformly curved section between the points 51 and 52 which is curved in the vertical plane concave towards the earth's middle point. At this continuously curved portion 51 to 52 is connected at point 52 a section 53 which is bent relatively steeply upwards and forms a catch chamber.

If the apparatus according to FIGURE 1 is located in a vehicle, which is moving in the direction of the arrows 54 and is braked, there is produced a horizontal inertia force $m.b$, which is reduced to a resultant by the gravitational force $m.g$. The air bubble 50 moves in the tube 49 to a point at which the tangent 55 at the upper tube wall stands perpendicular to this resultant. If this is the point 52, in which the fall of the tube wall is at its greatest, the air bubble 50 moves into the portion of the tube 53 and remains there. The cause of such a result is that the ratio of $b:g$ is greater or equal to the tangent of the inclination angle $\alpha$ of the tangent 55 to the horizontal 56, i.e.

$$\frac{b}{g} \geq \tan \alpha$$

It thus appears that if after the braking effect the air bubble is in the catch chamber 53, then the absolute retardation $b$ is at least equal to $g \tan \alpha$.

Should an acceleration be measured with this apparatus instead of a retardation the apparatus is set in the vehicle in the opposite direction with respect to the direction of movement 54.

By a simple alteration of the angle of inclination $\alpha$, the measurement of any desired value $b$ can be adjusted to. The arrangement of a measurement apparatus according to the invention in which the angle $\alpha$ can be varied is schematically represented in FIGURE 2. In this constructional form the measuring tube 57 consists moreover of a straight part 66 and collecting chamber 65. At the end opposite the chamber 65 of the straight section 66 is connected a short piece 64 which is downwardly directed.

The tube 57 is filled with liquid except for an air bubble 62 and is secured on a support arm 58 which is pivotal about a horizontal axis 59 on a horizontally extending base 60. In this way the tube 57 lies in a plane perpendicular to the axis 59 and to the direction of travel of the powered vehicle. The inclination $\alpha$ of the tube end 66 compared with the horizontal can be read on a scale 61 connected with the base 60. The swingable arrangement of the tube 57 on the support arm 58 further permits in the simplest way the return of the air bubble 62 into the upper region 63 of the straight section of the tube 66 if this has reached the chamber 65 in the course of the measurement.

There can also be used a closed housing wholly or partly of glass or transparent plastics material which accommodates in its interior the measuring tube 57 and is provided on its outside with a clamping disc, a rubber sucker or a plurality of this kind of clamping disc for securement on the vehicle window or other surface which lies in the direction of travel of the vehicle. In each embodiment it is to be noted that the apparatus is provided additionally with a device for measuring the direction of the horizontal i.e. a horizontal level.

According to FIGURES 3 and 4 two generally rectangular plates 1 and 2 are provided of which the forward and thicker plate 1 is of a transparent glass-like plastics material for example polymethylacrylic acid ester. The plate 2 preferably consists likewise of plastics material and preferably of the same material but however is not transparent and is coloured, for example, white. In the surface 3 of plate 1 which is directed towards plate 2 grooves of preferably circularly rounded cross-section are cut, each groove having two arms. The arms 4 preferably lie parallel to one another for example at 45° to the horizontal and serve as catch chambers, while the oppositely directed arms 5, 6, 7, 8 are inclined to the horizontal at a different angle. The angle of the arm 5 is the smallest whilst the angle of the arm 8 is the largest. The arms 5 to 8 serve, after partly filling the grooves with a measuring fluid, for recording and measuring of retardation and acceleration according to the equation $b = g \tan \alpha$, wherein $\alpha$ is the angle between the horizontal and one of the tubes 5 to 8.

The angle $\alpha$ of the right-hand end in FIGURE 3 of the measuring tube 5=17° corresponding to retardation to 3 m./s.$^2$, which is considered to be admissable. The corresponding value and amounts for the measuring tubes 6, 7, 8, are as follows:

|                   | Angle    | Retardation   |            |
|-------------------|----------|---------------|------------|
| Measuring tube 6  | 24°40′   | 4.5 m./s.$^2$ | normal.    |
| Measuring tube 7  | 31°30′   | 6 m./s.$^2$   | good.      |
| Measuring tube 8  | 37°25′   | 7.5 m./s.$^2$ | very good. |

Besides these measuring and recording tubes is provided a horizontal levelling tube in the form of a tube 10. This level is curved slightly upwardly so that in the horizontal position of the housing 1—2 the bubble of the levelling tube is located between the two points 11 and 12.

Not only the measuring tubes 5—8 with their chamber 4 but also the levelling tube 10 are filled with a measuring liquid for example coloured petroleum. The two housing parts 1, 2 are placed adjacent and sealed together for example by inserting an adhesive. The location of the apparatus takes place by means of two suction heads 13, which are secured to spacing pieces 9, 34 with the help of screws 14. The spanning piece 34 is secured by means of a threaded bolt 35 screwed into a tapped hole in the two plates 1—2, while the spacing piece 9 has for the same purpose a threaded pin 36, which is screwed into a tapped hole in the united plates 1—2. The two intermediate pieces 9, 34 are of different length because the side windows of motor vehicles are generally inclined to the vertical in the direction of travel.

The apparatus according to FIGURES 5-8 is constructed on a similar plan. It consists of a thick plate 15 of transparent plastics material, in particular polymethylacrylic acid ester, while the preferably thinner plate 16 consists of coloured, especially white, polymethylacrylic acid ester.

The catch chambers engraved in the plate 15 are designated by 17 and lie parallel to one another at 45° to the horizontal. To these chambers are connected measuring tubes 18, 19, 20, 21 and 22 likewise engraved in the plate 15. The level tubes 17—18 serve for testing the hand brake of a powered vehicle, whilst the level tubes 17—19, 17—20, 17—21 and 17—22 serve for testing the foot brake. The values of the individual tubes 18 to 22 are as follows:

|            | Inclination | Retardation   |                                                   |
|------------|-------------|---------------|---------------------------------------------------|
| Tube 17–18 | 8°40′       | 1.5 m./s.$^2$ | hand brake—normal.                                |
| Tube 17–19 | 17°         | 3 m./s.$^2$   | foot brake { moderate.                            |
| Tube 17–20 | 24°40′      | 4.5 m./s.$^2$ | foot brake { normal.                              |
| Tube 17–21 | 31°30′      | 6 m./s.$^2$   | foot brake { good.                                |
| Tube 17–22 | 37°25′      | 7.5 m./s.$^2$ | foot brake { very good.                           |

An upwardly arched tube 23 serves as a level for positioning the double plate 15—16 with respect to the horizontal. The individual level tubes are moreover filled with a liquid for example red coloured petroleum, an air bubble being left in each tube. The plate 15 is stepped above and below at the narrow edges so that lugs 24, 25 are formed, which are less thick than the plates 15—16; the two plate members 15, 16 are in general—as in the embodiment according to FIGURES 3 and 4—secured to one another for example by welding or by the use of an adhesive.

The lugs 24 and 25 lie adjustably between the two frame members 27, 28, which are clamped together by nuts and bolts 37 and together form a circular guide track 38 in which the lugs 24, 25 of the united plates 15—16 are displaceably engaged, in that the plates 15—16 turn during a displacement movement about the axis of the guide track 38. The lug 24 is provided with a recess 29 which serves for receiving a leaf spring 30 which is connected fast to the housing plate 15 by means of a tapped peg 31.

The two free ends of the sheet spring 30 lie against the frame member 28. It is in these circumstances possible to turn the plate 15 and therewith the whole housing 15, 16 in the circular track, so that it is held by the spring 30 in any position. One can in this way move the housing 15, 16 in the horizontal plane very easily without moving the members 27, 28 already fixed in the vehicle.

For securing the two-part frame 27, 28 for example on a side window of a power driven vehicle, three suction heads 33 of rubber or plastic material are provided, which are moreover secured on a sub-frame 39 by means of intermediate pieces 40 and screws 41, which project through borings provided in the suction heads and the sub-frame and are screwed into tapped borings 26 in the intermediate pieces.

The intermediate piece 40 has at its end opposite this threaded boring 26 a ball socket 42 in which a ball head 43 rotatably engages. Two of these ball heads are provided with long threaded spindles 44 which have actuating heads 45. These threaded spindles are screwed into tapped borings in each of the tapped pieces 46, which have an outer thread which projects through a corresponding boring of the double frame 27, 28 and is secured by means of a nut 47 to the double frame. The third bore head 43 has only a short threaded spindle 48 which projects through a corresponding bore of the double frame 27, 28 and is secured there by a nut and counter nut 32. By rotating the threaded spindle 44 by means of the operating head 45 the position of the double plate 15—16 can be altered and at the same time it can be turned in the guide track.

In order to carry out a brake test with the help of the described apparatus this is secured by means of the suction heads for example on the left-hand window of the vehicle if the driving direction of the vehicle is to the right in FIGURES 3 and 6. In the apparatus adjusted to a horizontal position by means of the level 10 or 23, all bubbles are located in the rest position in the right-hand measuring tubes of FIGURES 1 and 4. After carrying out the brake test some bubbles are in the left-hand end of their measuring tube so that the tube among these tubes of which the right-hand end has the greatest inclination to the horizontal gives the highest deceleration value which has been reached.

What I claim is:

1. An apparatus for measuring limit-values of accelerations and decelerations of vehicles comprising in combination, a housing made of two superimposed discs combined in a fluid-tight manner, one of said discs being made of transparent material and one of said discs being provided with a plurality of grooves having upwardly inclined linear middle portions, the angles of which differ relative to each other, said middle portions communicating at their lowest points with upwardly directed portions, and at their highest points with downwardly directed portions, said grooves containing a liquid and a gas bubble, said housing having two parallel sides and two circular sides, the latter being rotatably guided in a circular frame about a horizontal axis perpendicularly directed to the longitudinal direction of said grooves, said parallel sides being spaced apart a distance substantially less than the diameter of said frame, said frame being provided with adjustable mounting means for supporting said apparatus upon the vehicle to be tested.

2. An apparatus as claimed in claim 1 wherein suction cups are mounted on the frame for fastening the latter on a window or similar smooth surface.

3. An apparatus as claimed in claim 1 wherein said frame comprises a first and a second member, said first member being provided with suction cups for mounting said first member on a window or the like surface, and said second member being adapted to guide said housing and adjustably connected with said first member by means of threaded spindles and universal joints.

4. An apparatus as claimed in claim 1 wherein one of said circular sides of said housing has a recess in its circumferential surface adapted to receive a spring leaf acting on an inner annular surface of said frame.

5. An apparatus as claimed in claim 1 wherein indicating means for the proper rest position of said housing is provided, said means comprising an upwardly curved groove mounted on said housing containing a volume of liquid and a gas bubble.

References Cited in the file of this patent

UNITED STATES PATENTS

| | | |
|---|---|---|
| 479,196 | Paoli | July 19, 1892 |
| 1,842,384 | Blanchard | Jan. 26, 1932 |
| 2,021,667 | Miess | Nov. 19, 1935 |
| 2,108,791 | Alden | Feb. 22, 1938 |
| 2,119,145 | Zadig | May 31, 1938 |
| 2,157,514 | Whipple | May 9, 1939 |
| 2,232,567 | Shroyer | Feb. 18, 1941 |
| 2,777,210 | Johnson et al. | Jan. 15, 1957 |
| 2,870,280 | Kraus | Jan. 20, 1959 |

FOREIGN PATENTS

| | | |
|---|---|---|
| 862,525 | Germany | Jan. 12, 1953 |
| 426,716 | Great Britain | Apr. 3, 1935 |
| 180,845 | Switzerland | Nov. 15, 1935 |